Aug. 27, 1940.  L. J. FAULDER  2,212,999
FILE OR LIKE GRINDING MECHANISM
Filed Oct. 14, 1937  3 Sheets-Sheet 1

Inventor
Leander J. Faulder

By J. Ralph Barrow,
Attorney

Aug. 27, 1940. L. J. FAULDER 2,212,999
FILE OR LIKE GRINDING MECHANISM
Filed Oct. 14, 1937 3 Sheets-Sheet 2
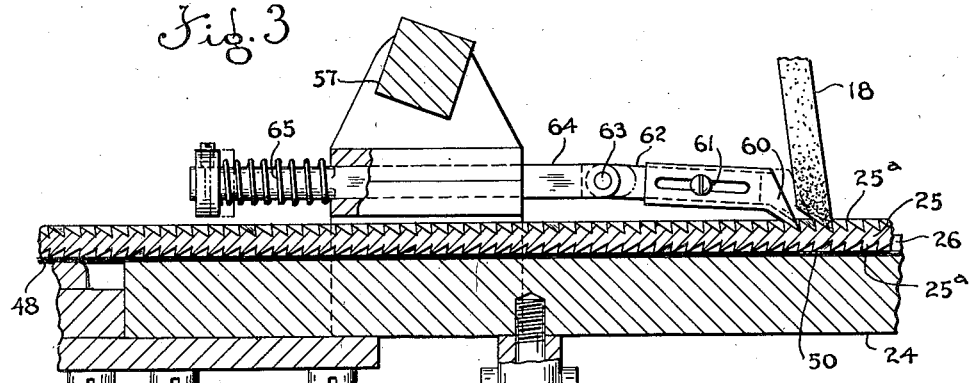
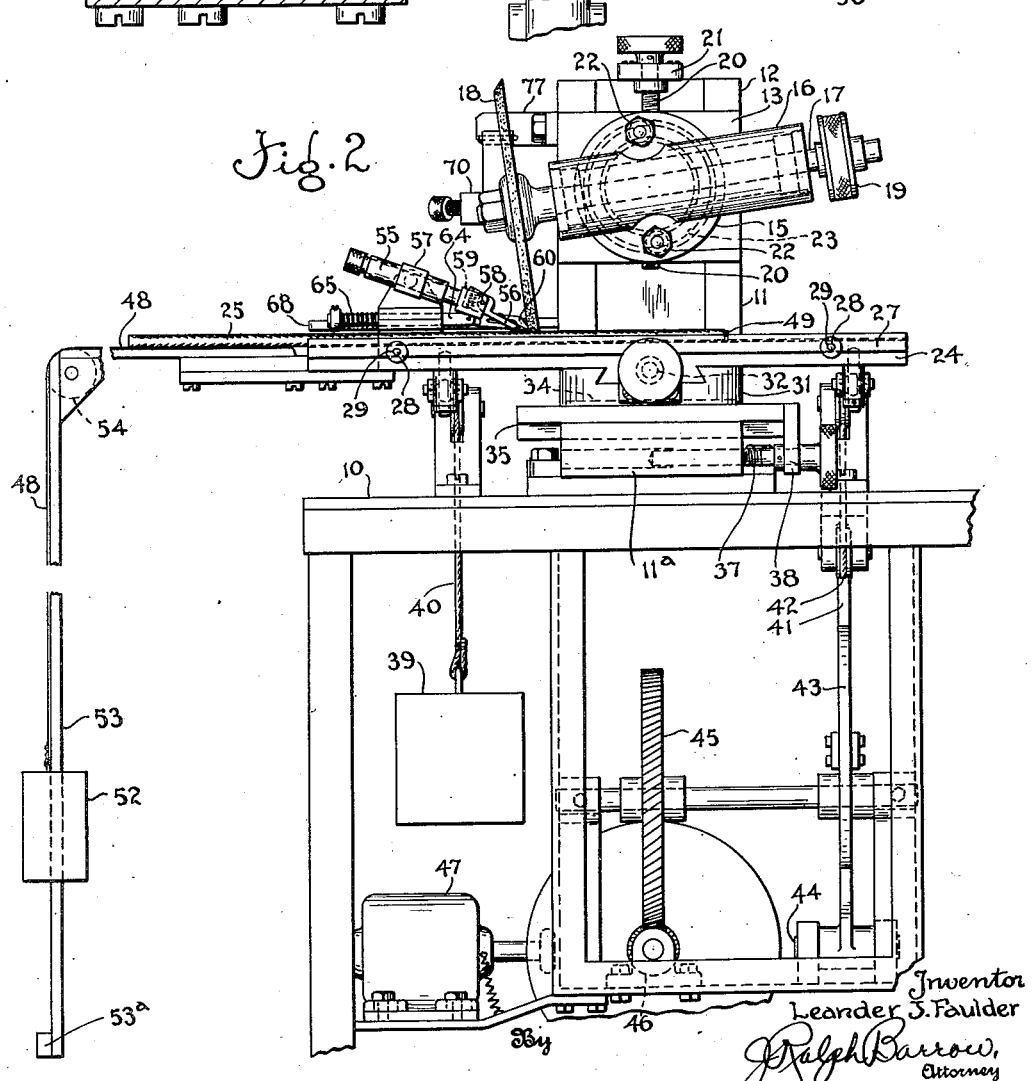
Inventor
Leander J. Faulder
By J Ralph Barrow,
Attorney

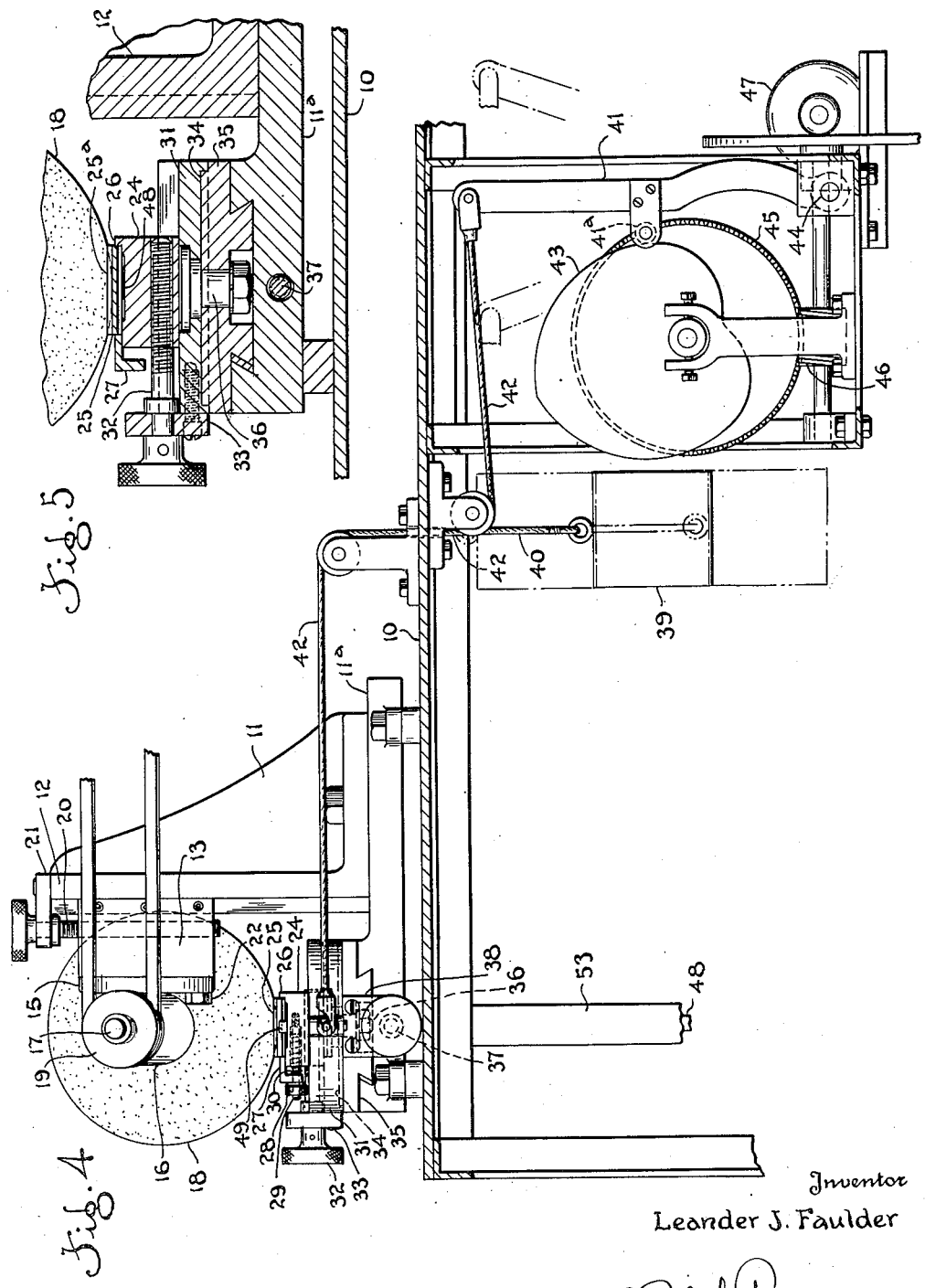

Patented Aug. 27, 1940

2,212,999

UNITED STATES PATENT OFFICE 2,212,999

FILE OR LIKE GRINDING MECHANISM

Leander J. Faulder, Akron, Ohio

Application October 14, 1937, Serial No. 168,953

10 Claims. (Cl. 51—96)

This invention relates to file or like grinding mechanism capable of use for sharpening the teeth of used files or for making new files.

The general purpose of the invention is to provide a simple, effective grinding mechanism capable of effectively sharpening or forming the teeth in a file or the like of hardened metal.

A more particular object of the invention is the provision in a grinder of a work carriage movable in association with a grinding tool to make an arcuate cut along a predetermined radius.

Another object of the invention is to provide in such a work carriage a means for readily centering the work respecting the grinder.

Another object is to provide simple effective means for intermittently advancing the work for re-dressing or cutting a series of teeth in the work.

Another object of the invention is the provision of a work carriage and grinder so associated as to swing the work through an arc in such relation to the grinding tool as to make a slightly convex cut across the face of a file or the like.

A further object of the invention is to provide apparatus of the character described which will be fully automatic in its operation.

The foregoing and other purposes or objects of the invention are attained in the device illustrated in the accompanying drawings and described below. It is to be understood that the invention is not limited to the specific form thereof shown and described.

Of the accompanying drawings:

Figure 2 is a front elevation thereof.

Figure 3 is a section on line 3—3 of Figure 1.

Figure 4 is an end elevation partly in section.

Figure 5 is a section on line 5—5 of Figure 1.

Figure 1:
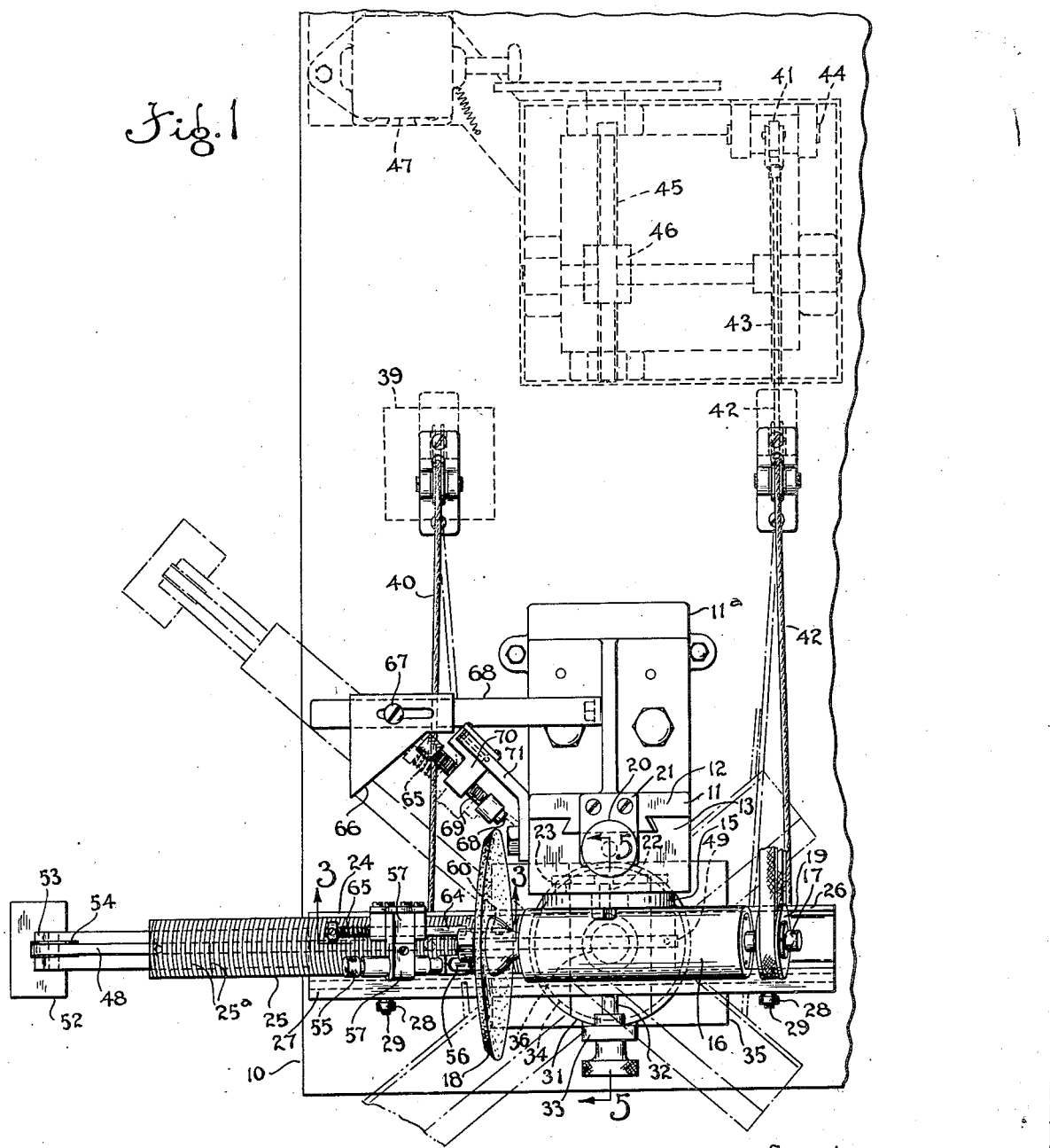
Figure 1 is a plan view of apparatus embodying the invention.

Referring to the drawings, the numeral 10 designates a suitable supporting base structure or table on which is mounted a bracket 11 provided with a vertical guide 12 on which is a vertically adjustable block 13 carrying an angularly adjustable support 15 for a bearing 16 in which is rotatably mounted a shaft 17 on which may be secured a grinding wheel or disc 18 and which shaft 17 may be driven by a pulley 19.

Block 13 may be vertically adjusted by a screw 20 threaded through block 13 and rotatably mounted on bracket 11 at 21. Support 15 may be angularly adjusted on block 13 by loosening bolts 22, 22 held in undercut annular groove 23 in block 13 and swinging bearing 16 to any desired angle and then tightening bolts 22. The angle at which grinder 18 is set depends upon the degree of undercut desired in the file teeth and the angle of the face of the teeth as will be explained.

Associated with the grinder 18 is a work support or carriage 24 for receiving a file 25 to be cut or re-cut. The carriage 24 may have a fixed flange 26 at one side and an adjustable flange 27 at the other to receive and retain a file 25 therebetween. Flange 27 may be adjusted by nuts 28, 28 threaded on bolts 29, 29 extended through flange 27 into carriage 24 and having springs 30, 30 normally urging flange 27 away from flange 26, the nuts adjusting flange 27 against the yielding resistance of springs 30.

The work carriage 24 is forwardly and rearwardly adjustable to center the work widthwise with the grinder 18 as will be described. To this end, it is mounted on its swinging support 31 to be described so as to be slidable widthwise thereof and an adjusting screw 32 journaled in a bracket 33 secured to swinging support 31 is threaded into carriage 24.

As will be observed from inspection of Figure 1 the file 25 has therein a series of spaced arcuate teeth 25a, 25a. Hence, the swinging support 31 is provided to cause the carriage 24 to move the work in engagement with grinder 18 to cut or re-cut teeth 25a. Accordingly, swinging support 31 is mounted over a circular guide 34 on an adjustable base plate 35 mounted on the base 11a of bracket structure 11 and swinging support 31 is pivoted at 36 on the base plate 35 to swing thereon. Base plate 35 is adjustable endwise of the machine to vary the radius of swing of support 31 relative to grinder 18 for cutting files or the like with teeth of different radii. This adjustment may be provided by a screw 37 threaded into bracket base 11a and journaled in an arm 38 attached to base plate 35.

While it is within the spirit of the present invention to swing the work-supporting carriage by hand to perform a grinding operation upon a file tooth, it is preferred that this be accomplished automatically. For this purpose, the swinging support 31 is connected to a yielding means which may be a floating weight 39 by means of a cable 40 and to an operating arm 41 by means of a cable 42, cables 40 and 42 being trained about suitable guiding pulleys as shown. Weight 39 is adapted to swing the work in one direction and arm 41 in the other against the action of the weight, the swinging being effected and controlled by a cam 43 on which arm 41 rides at 41ª, arm 41 being pivoted at 44. Cam 42 may be driven through reduction gearing 45 and 46 by a motor 47.

It is desirable to provide automatic means for presenting the work tooth by tooth to the grinder. This can be accomplished by work-positioning means operable by swinging of the work carriage. This means may comprise a flexible band 48 having a work-engaging hook 49, the band extending under a file 25 with the hook 49 engaging in back of the end of the file (see Figure 2) a crossstrip being provided at 50 (Figure 3) to limit movement of the file by the band 48 and hook 49. A weight 52 slidable on a guide 53 supported on the swinging support 31 may be utilized yieldingly to urge the work in a direction opposite to that in which it is to be fed, band 48 passing over a pulley 54 on guide 53 and the latter having a bottom stop 53ª thereon to limit downward movement of the weight 52.

To hold a file 25 in position for a tooth cutting or re-dressing operation, a detent 55 is provided which has a yielding detent element at 56 normally for engaging in back of a file tooth to limit movement thereof by the weight 52 to a position of the file at which a tooth is to be cut or re-cut, said detent element permitting by yielding the advance of a succession of teeth to the work, the detent springing in back of the teeth in succession (Figure 2). The detent 55 is adjustably mounted in a bracket 57 carried by the carriage 24 so that the position of the detent may be varied to position the file teeth properly respecting grinder 18, and the detent element is pivoted at 58 and yieldingly urged downwardly by spring 59.

To advance the work under detent 55 against the action of weight 52 at each swinging operation after a tooth has been cut or re-cut, a work-advancing pawl is provided at 60 which is adapted to engage the teeth of a file 25 (see Fig. 3) and is adjustably mounted as at 61 on an arm 62 pivoted at 63 upon one end of a slidable element 64 mounted on work carriage 24 element 64 being normally urged in a direction opposite to work-feeding direction by a spring 65. The other end of slidable element 64 is arranged to engage with a cam plate 66 adjustably supported at 67 on an arm 68 fixed to bracket 11 and arranged so as to urge the pawl 60 in work-feeding direction as the work carriage swings to one extreme of its movement after a tooth-cutting operation (see Figure 1).

A grinding wheel redresser may be provided at 68 adjustably carried by screw 69 on an arm 70 pivotally mounted on a bracket 71 so that it may be moved across the outer or peripheral edge of grinder 18 to keep said edge at the proper angle for the desired tooth-forming cuts.

It will be understood that features of the device as shown may be utilized for making new files or the like. The particular adaptation shown, however, is to re-cutting or re-dressing old files for further use. These vary as to the radius of the teeth, and as to the centering of the arcs of the teeth widthwise of the tool. Hence, the work is adjustably mounted on the carriage 24 widthwise of the carriage and the pivot 36 is adjustable lengthwise of the machine relative to grinder 18. The depth of cut or grinder 18 is controlled by adjustment of screw 20 and the angle of cut by the adjustable grinder bearing bracket 16. When work is mounted in the machine, it is fed to the right as shown in Figure 2 and the pawl 60 and detent 56 are so set that after a feeding operation, there is a slight movement of retrogression of the work against the detent which holds it in proper relation to the tool or grinder 11.

At each cutting operation, the work carriage is swung from the chain-dotted position shown adjacent cam 66 through the full-line position shown and to the opposite chain-dotted position (Figure 1) and back again before the work is advanced for a cutting operation on a succeeding tooth.

The re-cutting of the teeth with a grinder obviates the necessity for annealing the hardened metal and produces a file out of the original hardened metal without the deterioration resulting from such annealing operations.

Modifications of the invention may be resorted to without departing from the spirit thereof or the scope of the appended claims.

What is claimed is:

1. Apparatus for cutting a series of arcuate cuts in tools or the like such as files, said apparatus comprising a cutting tool, a work-carriage associated with said cutting tool, said carriage being pivotally mounted to swing said work through an arc respecting said cutting tool, means associated with said carriage for advancing the work on said carriage, and means engaging said work-advancing means to operate the same as said carriage is swung away from said cutting tool, said cutting tool thereby cutting a series of arcuate cuts in the work as it is advanced, said work-advancing means comprising a pawl engageable with said teeth and shiftable on the work-carriage, yielding means normally urging work in a direction opposite to that in which it is fed and a detent for engaging said teeth to hold the work in proper relation to the cutting tool after it has been advanced by said pawl.

2. Apparatus for cutting a series of arcuate cuts in tools or the like such as files, said apparatus comprising a cutting tool, a work-carriage associated with said cutting tool, said carriage being pivotally mounted to swing said work through an arc respecting said cutting tool, means associated with said carriage for advancing the work on said carriage, and means engaging said work-advancing means to operate the same as said carriage is swung away from said cutting tool, said cutting tool thereby cutting a series of arcuate cuts in the work as it is advanced, the pivotal mounting for said work-carriage being adjustable relative to said cutting tool to vary the radius of said arcuate cuts.

3. Apparatus for cutting a series of arcuate cuts in tools or the like such as files, said apparatus comprising a cutting tool, a work-carriage associated with said cutting tool, said carriage being pivotally mounted to swing said work through an arc respecting said cutting tool, means associated with said carriage for advancing the work on said carriage, and means engaging said work-advancing means to operate the same as said carriage is swung away from said cutting tool, said cutting tool thereby cutting a series of arcuate cuts in the work as it is advanced, said last-named means comprising a fixed cam in the path of said work-advancing means.

4. Apparatus for cutting a series of arcuate cuts in tools or the like such as files, said apparatus comprising a cutting tool, a work-carriage associated with said cutting tool, said carriage being pivotally mounted to swing said work through an arc respecting said cutting tool, means associated with said carriage for advancing the work on said carriage, and means engaging said work-advancing means to operate the same as said carriage is swung away from said cutting tool, said cutting tool thereby cutting a series of arcuate cuts in the work as it is advanced, said work-advancing means comprising a pawl engageable with said teeth and shiftable on the work-carriage, said engaging means comprising a fixed cam in the path of said work-advancing means.

5. Apparatus for cutting a series of arcuate cuts in tools or the like such as files, said apparatus comprising a cutting tool, a work-carriage associated with said cutting tool, said carriage being pivotally mounted to swing said work through an arc respecting said cutting tool, means associated with said carriage for advancing the work on said carriage, and means engaging said work-advancing means to operate the same as said carriage is swung away from said cutting tool, said tool thereby cutting a series of arcuate cuts in the work as it is advanced, said work-advancing means comprising a pawl for cooperating with said teeth and shiftable on the work-carriage, yielding means normally urging work in a direction opposite to that in which it is fed and a detent for cooperating with said teeth to hold the work in proper relation to the cutting tool after it has been advanced by said pawl, said engaging means comprising a fixed cam in the path of said work-advancing means.

6. The combination in a machine for making a series of dressing cuts on the teeth of an arcuate-tooth file comprising a cutting tool, a pivoted work carriage, means for swinging the work carriage past the cutting tool so that said tool will engage a file in said carriage during substantial portions of the swinging movements thereof, means on the carriage for advancing the work tooth by tooth to the tool, and means for engaging and operating the work-advancing means actuated by swinging of the carriage away from the tool.

7. Apparatus of the class described comprising a cutting tool, a work-carriage, means for continuously swinging said work-carriage in arcs to and fro past said cutting tool so that the work is in contact with the tool over portions of said arcs, means on said work-carriage for shifting the work, and means operable by the swinging of said carriage away from said tool for engaging said work-shifting means progressively to shift the work in said carriage, said cutting tool thereby progressively cutting a series of arcuate cuts in the work as it is advanced between cutting operations.

8. Apparatus of the class described comprising a cutting tool, a carriage for work to be operated upon by said tool, a pivoted mounting for said carriage, and means to swing the carriage on its pivot for moving a face of the work in a plane transversely past the tool to make a transversely arcuate cut of substantially uniform depth, and means for adjusting the work widthwise to determine the widthwise position of the arcuate cuts on the work.

9. Apparatus of the class described comprising a cutting tool, a carriage for work to be operated upon by said tool, a pivoted mounting for said carriage, and means to swing the carriage on its pivot for moving a face of the work in a plane transversely past the tool to make a transversely arcuate cut of substantially uniform depth, said pivoted mounting being adjustable to vary the radius of such cuts, and means for adjusting the work widthwise to determine the widthwise position of the arcuate cuts on the work.

10. The combination in a machine for redressing arcuate-tooth files or the like, of a rotary cutting tool having a fixed axis and a file-carriage pivoted to swing over an arc past said cutting tool, to carry a file into cooperation with said tool so that said tool will engage the file over a substantial portion of said arc, and means operable by the swinging of said carriage past said cutting tool to advance the file on the carriage to present the teeth of the file in succession to the cutting tool.

LEANDER J. FAULDER.